United States Patent [19]

Tanaka

[11] Patent Number: 4,481,537
[45] Date of Patent: Nov. 6, 1984

[54] APERTURE CORRECTION CIRCUIT
[75] Inventor: Sadaaki Tanaka, Hadano, Japan
[73] Assignee: Sony Corporation, Tokyo, Japan
[21] Appl. No.: 396,002
[22] Filed: Jul. 7, 1982
[30] Foreign Application Priority Data Jul. 9, 1981 [JP] Japan .................................. 56-107397
Jul. 9, 1981 [JP] Japan .................................. 56-107396
Jul. 9, 1981 [JP] Japan ............................ 56-102152[U]

[51] Int. Cl.$^3$ .............................................. H04N 5/14
[52] U.S. Cl. .................................................. 358/162
[58] Field of Search .......................... 358/162, 166, 37

[56] References Cited

U.S. PATENT DOCUMENTS

2,929,870  3/1960  Gibson .................. 358/162
3,368,030  2/1968  Wiencek ................. 358/27
3,705,952 12/1972  Diehl ................... 358/162

Primary Examiner—John C. Martin
Assistant Examiner—Erin A. McDowell
Attorney, Agent, or Firm—Lewis H. Eslinger; Alvin Sinderbrand

[57] ABSTRACT

A delay circuit comprising a pair of modulators for executing biaxial quadrature modulation with carriers that have a 90° phase difference therebetween, a mixer which mixes the modulated output signals of the modulators together to produce a composite output signal, delay circuitry for delaying the composite output signal of the signal mixer, and a pair of demodulators which are respectively associated with the pair of modulators and serve to demodulate the delayed output signal supplied by the delay circuitry. The first of the two demodulators associated with the first of the two modulators, produces a first demodulated output signal, a portion of which is supplied to the second of the two modulators as a modulating signal. Additionally, the first demodulated output signal is delayed by the delay circuitry for a predetermined duration with respect to an input signal fed to the first modulator. The second demodulator associated with the second modulator, produces a second demodulated output signal which is delayed for twice the predetermined duration of the first modulator input signal.

13 Claims, 8 Drawing Figures

APERTURE CORRECTION CIRCUIT

BACKGROUND OF THE INVENTION

1. Field of the Invention

This invention relates to a delay circuit for use in equalization of a video signal and more particularly for use in vertical aperture equalization thereof.

In a video system which includes a television receiver or a pickup device, the operating frequency band of a video signal is generally processed through a variety of limiter and signal transmission circuits resulting in attenuation of the higher frequency component of the video signal and thereby reducing the video resolution. For example, when a chrominance subcarrier of 3.58 megahertz (MHz) is superposed on a luminance signal in a video amplifier circuit of a color television receiver, a luminance variation or beat of 3.58 MHz occurs. In order to eliminate such beat disturbance, the video amplifier circuit is designed with proper frequency characteristics such that the chrominance subcarriers at more than 15 to 16 decibels are attenuated. Typically, however, such attenuation also attenuates the higher frequency component of the video signal resulting in deterioration in the resolution of the reproduced picture. Additionally, in a shadow-mask type CRT, as the video signal frequency exceeds 2 MHz, the luminance modulation efficiency is gradually reduced, which diminishes the picture contrast and reduces the luminance modulation efficiency and thereby results in deterioration of the video resolution.

In compensating for such deterioration of resolution, it has been customary heretofore to perform aperture equalization by superposing a correction signal on the luminance signal so as to enhance the sharpness in the aperture of the picture. Generally, an overshoot or undershoot ranging from 20 to 30 percent is applied to a portion of the luminance signal waveform corresponding to the aperture of the picture, hence increasing the aperture sharpness and thereby enhancing the resolution.

2. Description of the Prior Art

Figure 1:
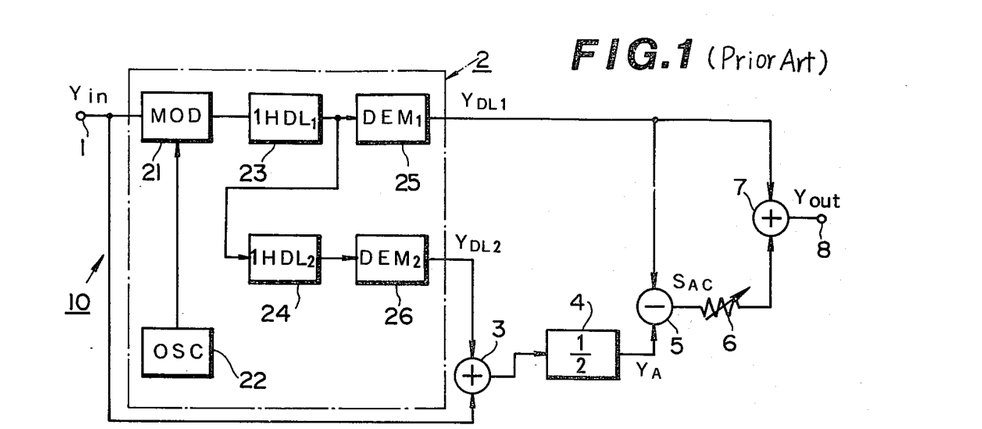
FIG. 1 is a block diagram of a conventional vertical aperture equalizer circuit.

In order to attain a higher vertical resolution, for example, a vertical aperture equalizer circuit 10, as shown in FIG. 1, has been commonly used heretofore.

An input luminance signal Yin to be equalized with regard to the aperture is fed to both a delay circuit 2 and a first signal adder 3 through a signal input terminal 1.

Figure 2:
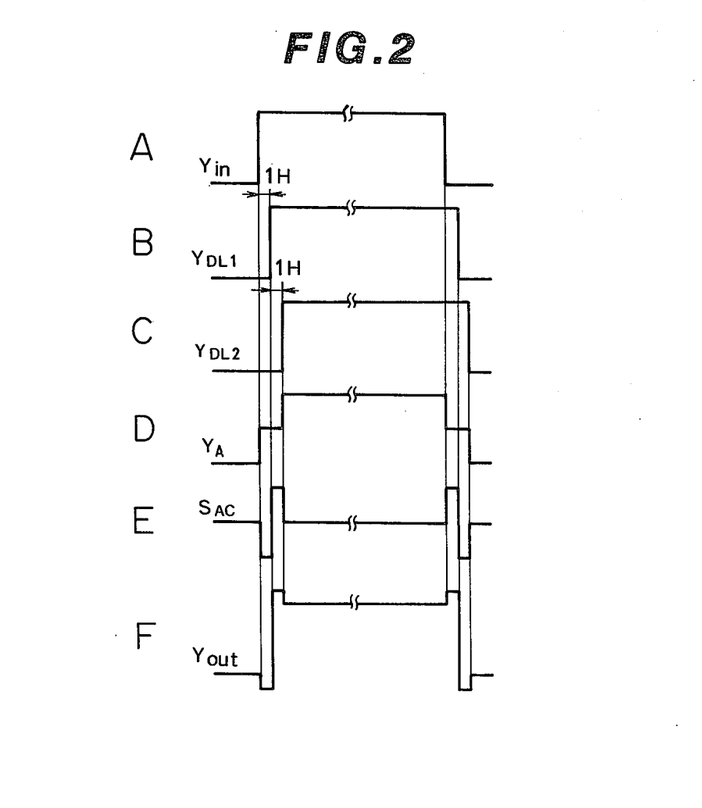
FIG. 2 is a time chart illustrating the operation of FIG. 1.

Delay circuit 2 includes two delay lines 23 and 24 each having a delay time $\tau$ equivalent to one horizontal scanning interval (1H) of input luminance signal Yin. A first delayed luminance signal $Y_{DL1Y}$ is delayed for a time of 1H relative to the input luminance signal Yin by delay line 23. A second delayed luminance signal $Y_{DL2}$ is delayed for an additional 1H time period to the first delayed luminance signal by second delay line 24. In delay circuit 2, the input luminance signal Yin, which is fed through input terminal 1, is superposed on a carrier, which is generated by an oscillator 22, in an amplitude modulator 21. The output of amplitude modulator 21 is fed to a first signal demodulator 25 via first delay line 23 and also to a second signal demodulator 26 via second delay line 24 which is connected in series with first delay line 23. Referring to FIG. 2, when an input luminance signal Yin, as shown in FIG. 2A, is fed to input terminal 1, signal demodulator 25 demodulates the luminance signal delayed for 1H by first delay line 23 and produces a first delayed luminance signal $Y_{DL1}$, as shown in FIG. 2B, having a delay of 1H relative to input luminance signal Yin. Additionally, the second signal demodulator 26 demodulates the luminance signal which has been delayed for 2H due to sequential 1H delays by delay lines 23 and 24, and thereby produces a second delayed luminance signal $Y_{DL2}$, as shown in FIG. 2C, having a delay of 2H relative to the input luminance signal Yin.

First signal $Y_{DL1}$ is supplied to both a signal subtracter 5 and a second signal adder 7, second signal $Y_{DL2}$ is supplied to first signal adder 3.

First signal adder 3 mixer input luminance signal Yin and second delayed luminance signal $Y_{DL2}$ together and supplies an output thereof to a signal attenuator 4 which produces a composite signal $Y_A$ as shown in 2D. Composite signal $Y_A$ is fed to signal subtracter 5 which subtracts signal $Y_A$ from first delayed luminance signal $Y_{DL1}$ and produces an aperture equalizing signal $S_{AC}$ as shown in FIG. 2E. Signal $S_{AC}$ is fed via a level controller 6 to a second signal adder 7, which superposes signal $S_{AC}$ on first delayed luminance signal $Y_{DL1}$.

The output luminance signal $Y_{OUT}$, which is obtained at an output terminal 8 from second signal adder 7, has a corrected waveform with vertical aperture equalization as shown in FIG. 2F. More specifically, vertical aperture equalization occurs since the aperture equalizing signal $S_{AC}$ is superposed on the vertical aperture of the picture where the luminance variation is present.

As described heretofore, vertical aperture equalizer circuit 10 requires that delay circuit 2 include two 1H delay lines 23 and 24 to produce a first delayed luminance signal $Y_{DL1}$ having a delay time of 1H relative to the input luminance signal Yin and a second delayed luminance signal $Y_{DL2}$ having a delay time of 2H relative to signal Yin.

Generally each delay line is expensive and dimensionally large, making it difficult to produce a compact delay line structure. In a conventional vertical aperture equalizer circuit, such as a circuit 10, which includes two high performance 1H delay lines, each having a relative large delay time $\tau$ and requiring wide-band characteristics, results in an unavoidably large spatial requirement of an extremely high production cost. In fact, substantially the entire cost of the circuit is based on delay lines 23 and 24.

OBJECTS AND SUMMARY OF THE INVENTION

Accordingly, it is an object of the present invention to provide a vertical aperture equalizer circuit which avoids the above-mentioned drawbacks of the prior art.

More specifically, it is an object of the present invention to provide a new and improved vertical aperture equalizer circuit which provides an acceptable video signal.

It is another object of the present invention to provide a vertical aperture equalizer circuit which is simpler and less costly to construct and more compact as compared to the prior art.

A further object of the present invention is to provide a vertical aperture equalizer circuit which includes only one delay element having a delay period f one horizontal scanning interval (1H), and providing delayed signals having one and two times the horizontal scanning interval relative to an input signal.

In accordance with an aspect of this invention, a video signal processing circuit comprises two modulating means, a delay means having a predetermined time duration and two demodulating means. An output signal from one of the two demodulating means, which has already been delayed due to the delay means, is fedback as an input signal to one of the two modulating means resulting in output signals from the two demodulating means having delay times equal to the predetermined time duration and twice the predetermined time duration relative to an input signal supplied to the other modulating means.

The above, and other objects, features and advantages of the invention will be apparent from the following detailed description which is to be read in conjunction with the accompanying drawings.

DESCRIPTION OF THE PREFERRED EMBODIMENTS

Figure 3:
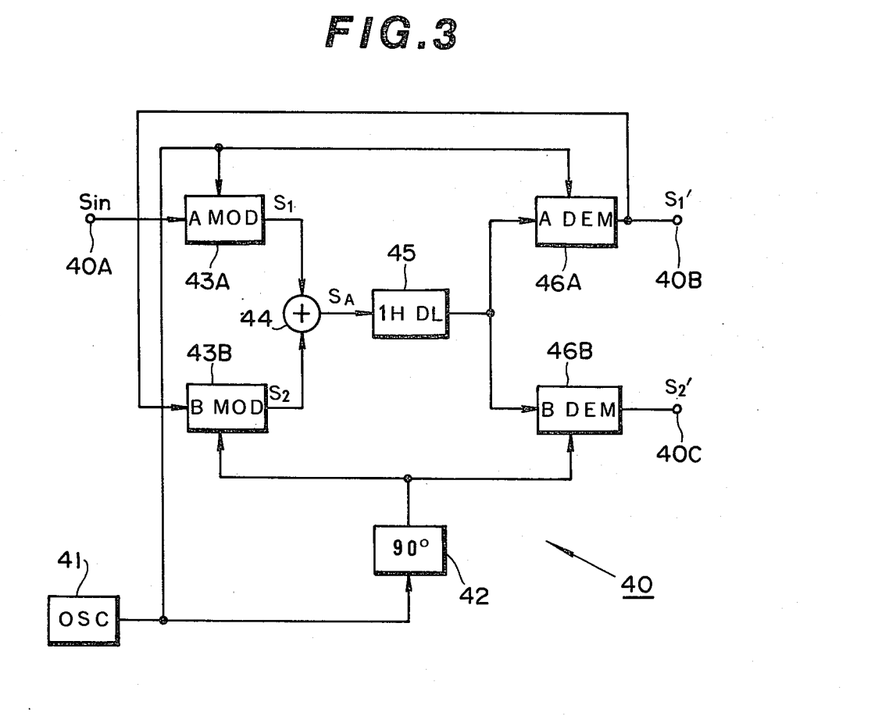
FIG. 3 is a block diagram of a delay circuit which can be used for vertical aperture equalization in accordance with the present invention.

As shown in FIG. 3, an output signal of an oscillator 41 is fed directly to both a first amplitude modulator 43A and a first signal demodulator 46A. Additionally, the output signal of oscillator 41 is supplied to a second amplitude modulator 43B and a second signal demodulator 46B through a phase shifter 42 which shifts the phase angle supplied to the input thereof by approximately 90°. An input signal Sin, received through a signal input terminal 40A, is fed to first amplitude modulator 43A. A signal adder 44 mixes the output signals S1 and S2 of first and second amplitude modulators 43A and 43B together to produce a composite output signal $S_A$, which is fed through a delay line 45 to both a first signal demodulator 46A and a second signal demodulator 46B. Output signals $S_{1'}$ and $S_{2'}$ from demodulators 46A and 46B, respectively, are supplied to first and second output terminals 40B and 40C, respectively.

Amplitude modulator 43A modulates a carrier, which is the output signal of oscillator 41, with input signal Sin obtained through terminal 40A to thereby produce a first amplitude-modulated output signal S1 composed of the output signal of oscillator 41 and input signal Sin superposed thereon. Output signal S1 is fed to adder 44. Second amplitude modulator 43B modulates a carrier, which is the output signal of oscillator 41 received through phase shifter 42, with first demodulated output signal S1' to produce a second modulated output signal S2 composed of the phase shifted output signal of phase shifter 42 and first demodulated output signal S1' superposed thereon. Signal S2 is also fed to signal adder 44.

Figure 4:
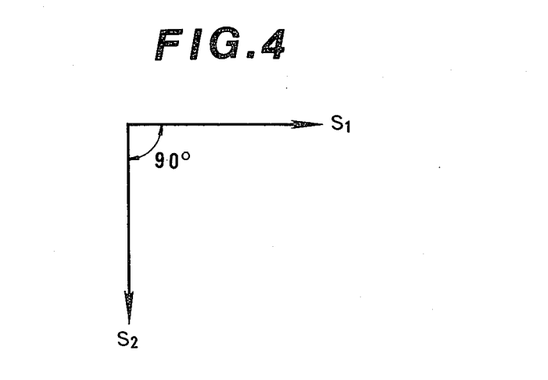
FIG. 4 is a vector diagram illustrating the phase relationship between the two modulated output signals in FIG. 3.

As shown in FIG. 4, output signals S1 and S2, which are fed to signal adder 44, have amplitude-modulated carriers which have a phase difference of approximately 90° therebetween. That is, biaxial quadrature modulation is performed by first and second amplitude modulators 43A and 43B.

A sync signal which is the output signal of oscillator 41, is supplied to first signal demodulator 46A which enables demodulator 46A to synchronously detect signal S1 within composite output signal $S_A$ received from adder 44 via delay line 45. That is, inasmuch as the synchronous (sync) signal supplied to demodulator 46A is electrically in-phase with the carrier of first amplitude modulator 43A, demodulator 46 can synchronously detect and demodulate merely first amplitude-modulated signal S1 included in the composite output signal $S_A$. Therefore, signal demodulator 46A serves to demodulate only first amplitude-modulated signal S1 delayed for the predetermined time $\tau$ of delay line 45, and produces a first demodulated output signal S1' having the delay $\tau$ relative to input signal Sin. First demodulated output signal S1' is both fed to second amplitude modulator 43B as an input signal thereto and supplied as a first delayed output signal to first signal output terminal 40B.

Similarly, second signal demodulator 46B performs synchronous detection with respect to the composite output signal $S_A$ by the use of a second sync signal which is the output signal of oscillator 41 received through phase shifter 42 and is in-phase with the carrier of second amplitude modulator 43B. Second signal demodulator 46B demodulates only second amplitude-modulated signal S2 included within composite output signal $S_A$ which has been delayed for the predetermined time $\tau$ by delay line 45. A second demodulated output signal S2', which is provided by demodulator 46B and is supplied to output terminal 40C, has a delay $\tau$ relative to first demodulated output signal S1' and 2$\tau$ relative to input signal Sin.

Thus, as disclosed in the first preferred embodiment of the present invention, it is possible to obtain, by means of single delay line 45, both first demodulated output signal S1' delayed relative to input signal Sin for a time equivalent to the predetermined delay $\tau$ of line 45 and second demodulated output signal S2' delayed relative to input signal Sin for a time equivalent to twice the delay $\tau$. Therefore, delay circuit 40, whose delay time 1H corresponds to the predetermined delay $\tau$ of line 45 in the first embodiment, may be employed in place of conventional delay circuit 2 as used in the prior art and as show in in FIG. 1.

Figure 5:
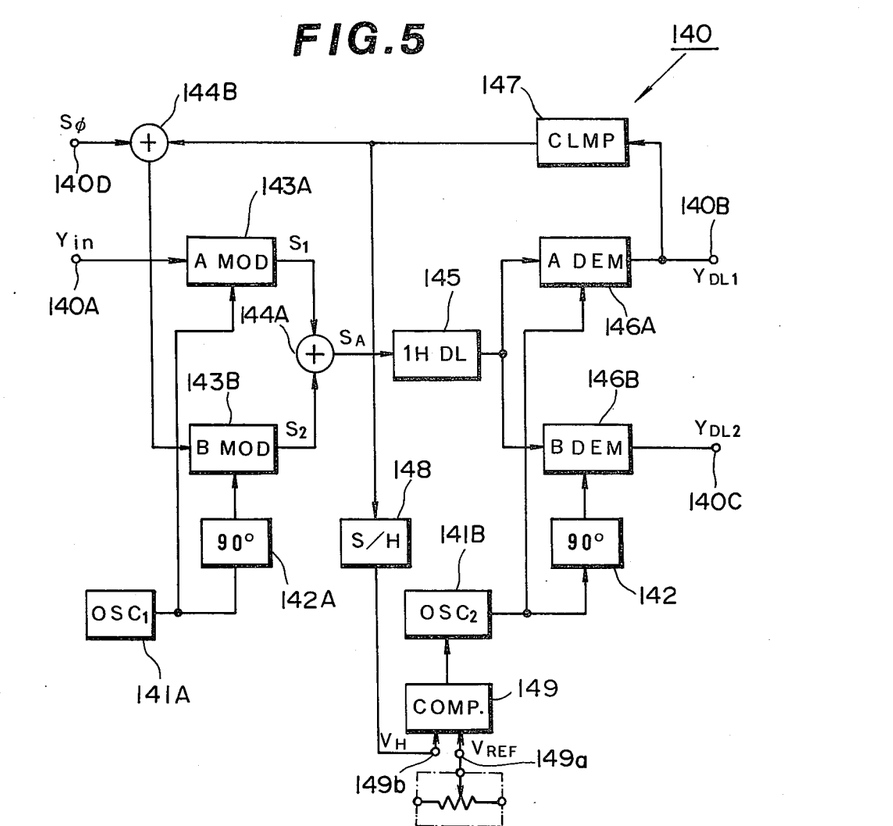
FIG. 5 is a block diagram of an alternative embodiment of a delay circuit which can be used for vertical equalization in accordance with the present invention.

FIG. 5 shows an alternative delay circuit 140 designed for effecting vertical aperture equalization in accordance with the present invention. In this alternative embodiment, an input luminance signal Yin is fed through a signal input terminal 140A to a first amplitude modulator 143A. Using input luminance signal Yin, first amplitude modulator 143A modulates a carrier received directly from a carrier oscillator 141A and thereby produces a first modulated output signal S1, which is fed to a first signal adder 144A. Adder 144A mixes first modulated output signal S1 with a second modulated output signal S2 received from a second amplitude modulator 143B and thereby produces a composite output signal $S_A$, which is fed to both a first signal demodulator 146A and a second signal demodulator 146B through a 1H delay line 145. First signal demodulator 146A performs synchronous detection with respect to composite output signal $S_A$ by the use of a sync signal received directly from a sync oscillator 141B. Demodulator 146A also demodulates first modulated output signal S1 of first amplitude modulator 143 and thereby produces a first delayed luminance signal $Y_{DL1}$. Signal $Y_{DL1}$ is delayed for a time equivalent to 1H by delay line 145 so as to have a 1H delay relative to input luminance signal Yin.

Figure 6:
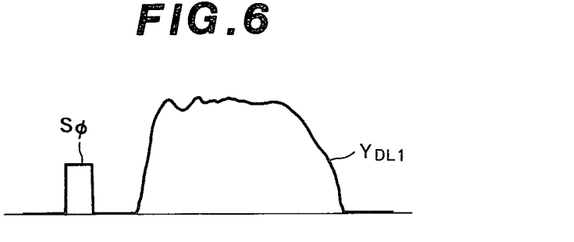
FIG. 6 shows a waveform of an input signal supplied to a second amplitude modulator of FIG. 5.

First delayed luminance signal $Y_{DL1}$ is supplied both as an output signal from a first signal output terminal 140B and is fed to a clamping circuit 147. Luminance signal $Y_{DL1}$ is clamped by circuit 147 and fed to a sample-and-hold circuit 148 and a second signal adder 144B, which superposes on first delayed luminance signal $Y_{DL1}$ a phase reference signal $S\phi$ received from a phase reference input terminal 140D. Superposition of phase reference signal $S\phi$ on signal $Y_{DL1}$ preferably occurs during a blanking period of the input video signal. For example, superposition can occur during the horizontal blanking period of Yin which generally results in $S\phi$ out of phase with $Y_{DL1}$ as shown in FIG. 6. First delayed luminance signal $Y_{DL1}$ of FIG. 6, including the superposed phase reference signal $S\phi$, is fed from the second signal adder 144B as an input signal to second amplitude modulator 143B.

Using first delayed luminance signal $Y_{DL1}$, second amplitude modulator 143B modulates a carrier received from carrier oscillator 141A through a first phase shifter 142A, having a shift angle of approximately 90°, and thereby produces a second modulated output signal S2, which is fed to first signal adder 144A.

That is first and second amplitude modulators 143A and 143B execute biaxial quadrature modulation with the carriers having a phase difference of approximately 90° therebetween.

In second signal demodulator 146B which receives through 1H delay line 143 the composite signal $S_A$, composite signal $S_a$ is synchronously detected by the use of a sync signal, supplied from sync signal generator 141B through second phase shifter 142 having a shift angle of approximately 90°, so that second modulated output signal S2 of second amplitude modulator 143B is demodulated. Second signal demodulator 146B produces a second delayed luminance signal $Y_{DL2}$ which is delayed by 1H delay line 145 a delay time of 1H relative to the first delayed luminance signal $Y_{DL1}$ and a delay time of 2H relative to the input luminance signal Yin.

It should be noted that although phase shifters 141A and 142 have been connected to second modulator 143B and second demodulator 146B, respectively, that phase shifters 142A and 142B could have been connected, instead, to modulator 143A and demodulator 146A, respectively, resulting in signal S2 and $Y_{DL2}$ 90° ahead of signals S1 and $Y_{DL1}$, respectively. Alternatively, phase shifters can be connected to both modulators and both demodulators as long as the carrier supplied to modulator 143A and the sync signal supplied to demodulator 146A are in phase with each other and the carrier supplied to modulator 143B and the sync signal supplied to demodulator 146B are in phase with each other.

The sync signal oscillator 141B, which supplies a sync signal to first and second signal demodulators 146A and 146B, is of a voltage-controlled type whose oscillation phase is controlled by the comparison output signal of a voltage comparator 149. Voltage comparator 149 receives a comparison reference voltage $V_{REF}$ at a first input terminal 149a and an output voltage $V_H$ at a second input terminal 149b from sample-and-hold circuit 148 which is obtained by sampling and holding the first delay luminance signal $Y_{DL1}$. Comparison reference voltage $V_{REF}$, supplied to voltage comparator 149, is set equal to a clamping voltage in the clamping circuit 147. Circuit 148 samples and holds a portion of the output signal of clamping circuit 147 which corresponds in phase to phase reference signal $S\phi$ superposed on first delayed luminance signal $Y_{DL1}$ in second signal adder 144B. More specifically, circuit 148 sample and holds that portion of clamped $Y_{DL1}$ which is in phase with $S\phi$. When the synchronous phase detection in first signal demodulator 146A is held properly, that is when the sync signal supplied by oscillator 141B is in phase with the carrier supplied by oscillator 141A, first delayed luminance signal $Y_{DL1}$ demodulated by first signal demodulator 146A includes none of the demodulated signal component included in second modulated output signal S2 of second amplitude modulator 143B. That is, first delayed luminance signal $Y_{DL1}$, which is fed to sample-and-hold circuit 148 includes none of phase reference signal $S\phi$ when synchronous phase detection occurs in first signal demodulator 143A resulting in the clamping level of the output signal of clamping circuit 147 being sampled and held by circuit 148. Consequently, voltage comparator 149, which compares output voltage $V_H$ of sample-and-hold circuit 148 with comparison reference voltage $V_{REF}$, which is equal to the clamping voltage, is able to control the oscillation phase of sync signal oscillator 142 through the comparison output voltage and thereby maintains synchronous phase detection in first signal demodulator 146A. In particular, by controlling the oscillation phase of sync signal oscillator 141B, stable synchronous phase detection in signal demodulators 146A and 146B can be performed despite variations in the delay characteristics of 1H delay line 145 due to, for example, secular change.

Figure 7:
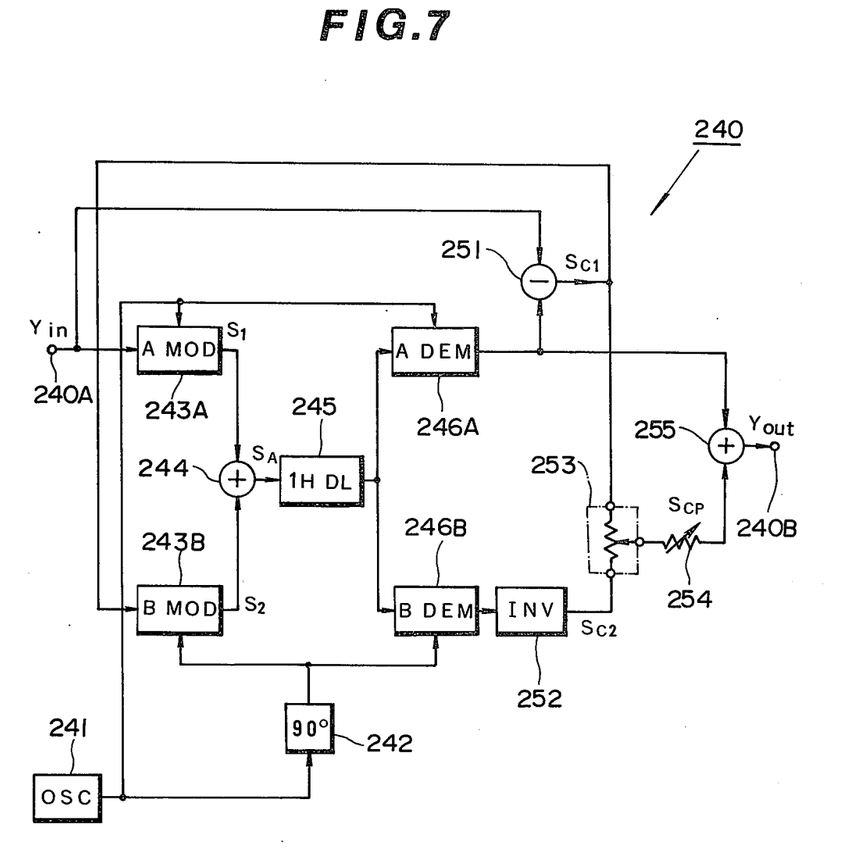
FIG. 7 is a block diagram of a vertical aperture equalizer circuit in accordance with the present invention.

FIG. 7, which illustrates a vertical aperture equalizer circuit 240, receives an input luminance signal Yin to be processed for vertical aperture equalization. Signal Yin is fed through a signal input terminal 240A to both a first amplitude modulator 243A and a signal subtracter 251. The first amplitude modulator 243A modulates a carrier, which is received directly from an oscillator 241, with input luminance signal Yin to produce a first modulated output signal S1, which is fed to a first signal adder 244. Adder 244 mixes first modulated output signal S1 with a second modulated output signal S2 obtained from a second amplitude modulator 243B and thereby produces a composite output signal $S_A$. Signal $S_A$ is fed through a 1H delay line 245 to both a first signal demodulator 246A and a second signal demodulator 246B. The first signal demodulator 246A performs synchronous detection with respect to the composite output signal $S_A$ by use of a sync signal received directly from oscillator 241, and demodulates first modulated output signal S1 of first amplitude modulator 243A and thereby produces a delayed luminance signal $Y_{DL}$. Signal $Y_{DL}$ is delayed for a time equivalent to 1H by delay line 245 resulting in a 1H delay relative to input luminance signal Yin. Delayed luminance signal $Y_{DL}$ is supplied to both a second signal adder 255 and signal subtracter 251.

Figure 8:
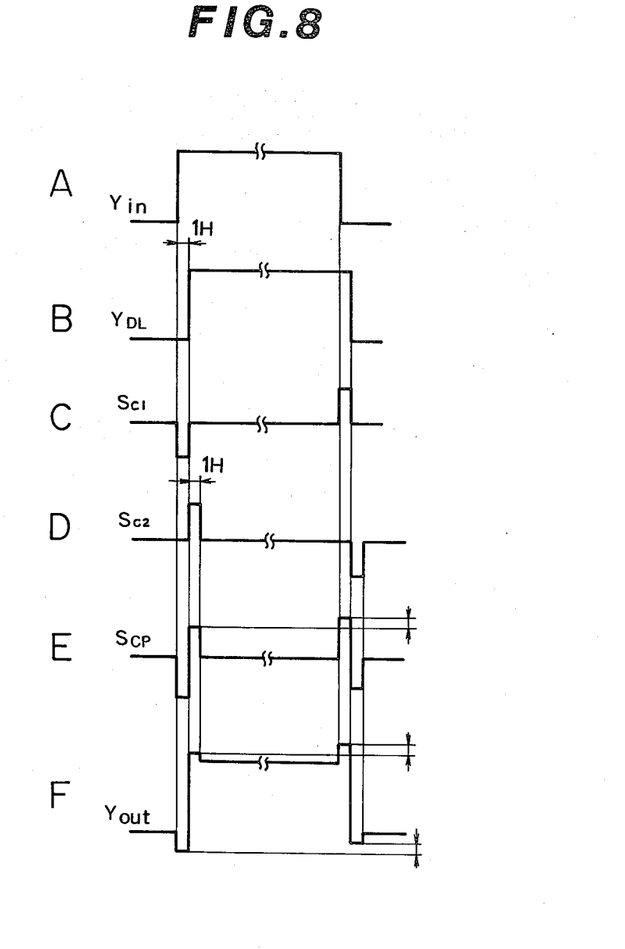
FIG. 8 is a time chart illustrating the operation of FIG. 7.

Referring to FIG. 8, delayed luminance signal $Y_{DL}$ which is demodulated by first signal demodulator 246A has, as shown in FIG. 8B, a delay time of 1H relative to input luminance signal Yin of FIG. 8A due to 1H delay line 245. By subtracting from delayed luminance signal Y_{DL} input luminance signal Yin, signal subtracter 251 provides a first vertical aperture equalizing signal Sc1 as illustrated in FIG. 8C. Signal Sc1 is fed to both a balance controller 253 and as an input signal to second amplitude modulator 243B.

Second amplitude modulator 243B modulates a carrier, which is received from oscillator 241 through phase shifter 242, having a shift angle of approximately 90°, with first vertical aperture equalizing signal Sc1 to produce second modulated output signal S2, which is fed to first signal adder 244.

That is, and similar to previously described embodiments, second modulators 243A and 243B execute biaxial quadrature modulation with the carriers having a phase difference of approximately 90° therebetween.

In second signal demodulator 246B, which receives via 1H delay line 245 composite signal $S_A$, composite signal $S_A$ is synchronously detected by the use of a sync signal supplied from oscillator 241 through 90° phase shifter 242, so that second modulated output signal S2 of second amplitude modulator 243B is demodulated. Second signal demodulator 246B produces a signal delayed by 1H delay line 245 for a time of 1H relative to first vertical aperture equalizing signal Sc1. The output signal of demodulator 246B is inverted with respect to its polarity by an inverter 252 and fed as a second vertical aperture equalizing signal Sc2, as shown in FIG. 8D, to a balance controller 253.

Balance controller 253 consists of, for example, a three-terminal variable resistor or potentiometer which mixes first and second vertical aperture equalizing signals Sc1 and Sc2 together in a proportion which corresponds to the resistance ratio of controller 253 to produce a vertical aperture equalizing signal Scp as illustrated in FIG. 8E. Signal Scp is fed through a level controller 254 to a second signal adder 255, which superposes the level controller output signal on the delayed luminance signal $Y_{DL}$. Therefore, an output luminance signal Yout, which is supplied from second signal adder 255 to a signal output terminal 240B, is controllable by balance controller 253 with regard to the amount of vertical aperture equalization or the ratio between the overshoot and undershoot applied to that portion of the output signal Yout corresponding to the vertical aperture of the television picture screen.

As described heretofore with reference to all of the embodiments, the delay circuit, according to the present invention, is characterized by a pair of modulator means for executing biaxial quadrature modulation with carriers having approximately a 90° phase difference therebetween, signal mixer means for mixing the modulated output signals of the modulator means together to produce a composite output signal, delay means for delaying the composite output signal of the signal mixer means, and a pair of demodulator means associated with the modulator means, respectively, and serving to demodulate the delayed output signal of the delay means. A first of the demodulator means associated with a first of the means produces a first output signal delayed for a predetermined time by the delay means with respect to an input signal fed to the first of the modulator means. The first output signal is fed to the second of the modulator means which is associated with the second demodulator means. A second output signal produced by the second demodulator means is delayed for twice the predetermined delay time of the delay means with respect to the input signal. Thus, the delay circuit is capable of providing with a single delay means such as a single delay line, two delayed output signals which respectively have a predetermined delay time of the delay line and twice the delay time. Thus, it becomes possible to attain optimal capabilities for vertical aperture equalization at a reduced manufacturing cost and to construct a vertical aperture equalization circuit in a more compact structure as compared to the prior art.

Having described specific embodiments of the invention with reference to the accompanying drawings, it is to be understood that the invention is not limited to these precise embodiments, and that many modifications and variations may be effected therein by one skilled in the art without departing from the scope or spirit of the invention which is intended to be defined by the appended claims.

What is claimed is:

1. A video signal processing circuit, comprising first modulating means for modulating a first modulating carrier which has a first phase angle and is modulated by an input video signal to produce a first modulated video signal, second modulating means for modulating a second modulating carrier which has a phase angle in quadrant to said first phase angle and the same frequency as said first modulating carrier and which is modulated by an input signal to produce a second modulated video signal, mixing means for adding said first and second modulated video signals together and producing a mixed video signal, delay means for delaying said mixed video signal for a predetermined duration and producing a delayed output signal, first demodulating means for demodulating said delayed output signal in accordance with a first demodulating carrier which has the same phase angle as said first modulating carrier and provides a first demodulated output signal which forms said input signal to said second modulating means and which is delayed by approximately said predetermined duration relative to said input video signal, second demodulating means for demodulating said delayed output signal in accordance with a second demodulating carrier which has the same phase angle as said second modulating carrier and provides a second demodulated output signal which is delayed by approximately twice said predetermined duration relative to said input video signal, first oscillating means for providing said first and second modulating carriers and second oscillating means for providing said first and second demodulating carriers, control means for controlling the phase of said first and second demodulating carriers by supplying a control signal to said second oscillating means in response to a first reference signal and said first demodulated output signal, said control means comparing the level of said first reference signal to the level of said first demodulated output signal and providing said control signal in accordance with said comparison, and wherein said second modulating means is modulated by said first demodulated output signal and a second reference signal, having a second phase angle, which is superposed on said first demodulated output signal by an adding means during a portion of the horizontal blanking period of said input video signal.

2. The video signal processing circuit as in claim 1; wherein said control means includes sample and hold means for sampling and holding that portion of said first demodulated output signal which is substantially in phase with said second reference signal and providing an output signal which is used as said level of said first demodulated output signal in said comparison.

3. A video signal processing circuit as in claim 2; wherein that portion of said first demodulated output signal which modulates said second modulating carrier and is sampled and held by said sample and hold means is clamped to a clamping voltage by a clamping means.

4. A video signal processing circuit as in claim 3; wherein the level of said first reference signal is equal to the level of said clamping voltage.

5. The video signal processing circuit as in claim 1; further comprising vertical aperture equalizing means for providing a vertical aperture equalizing video output signal in response to the output signals of said first and second demodulating means and said input video signal.

6. The signal processing circuit as in claim 5; wherein said vertical aperture equalizing means comprises first adding means for adding the output signal of said second demodulating means and said input video signal together, a subtracting means for subtracting the output signal of said first adding means from the output signal of said first demodulating means, and second adding means for adding the output signal of said first demodulating means and the output signal of said subtracting means together and producing a vertical aperture equalizing video output signal.

7. A video signal processing circuit as in claim 1; wherein said predetermined duration is approximately equal to one horizontal scanning interval relative to said input video signal.

8. A video signal processing circuit as in claim 1; wherein said first oscillating means includes a first phase shifter which shifts the phase of said first modulating carrier by approximately 90° to provide said second modulating carrier and further wherein said second oscillating means includes a second phase shifter which shifts the phase of said second modulating carrier by approximately 90° to provide said second demodulating carrier.

9. A video signal processing circuit as in claim 8; wherein each of said first and second oscillating means includes an oscillator.

10. A video signal processing circuit as in claim 9; wherein said oscillator included in said second oscillating means is a voltage controlled oscillator.

11. A video signal processing circuit as in claim 10; wherein said control signal is supplied to said voltage controlled oscillator.

12. A video signal processing circuit, comprising first modulating means for modulating a first modulating carrier which has a first phase angle and is modulated by an input video signal to produce a first modulated video signal, second modulating means for modulating a second modulating carrier which has a phase angle in quadrant to the phase angle of said first modulating carrier and the same frequency as said first modulating carrier and which is modulated by an input signal to produce a second modulated video signal, mixing means for adding said first and second modulated video signals together and producing a mixed video signal, delay means for delaying said mixed video signal for a predetermined duration and producing a delayed output signal, first demodulating means for demodulating said delayed output signal in accordance with a first demodulating carrier which has the same phase angle as said first modulating carrier and provides a first demodulated output signal which is delayed by approximately said predetermined duration relative to said input video signal, second demodulating means for demodulating said delayed output signal in accordance with a second demodulating carrier which has the same phase angle as said second modulating carrier and provides a second demodulated output signal which is delayed by approximately twice said predetermined duration relative to said input video signal, a phase shifter which shifts the phase angle of said first modulating and demodulating carriers by approximately 90° to provide said second modulating and demodulating carriers, and vertical aperature equalizing means for providing a vertical aperture equalizing video output signal in response to the output signals of said first and second demodulating means and said input video signal, wherein said vertical aperture equalizing means includes first subtracting means for subtracting said input video signal from the output signal of said first demodulating means and for providing an output signal which serves as said input signal for said second modulating means, second subtracting means for subtracting the output signal of said second demodulating means from the output signal of said first subtracting means, and adding means for adding the output signals of said first demodulating means and said second subtracting means and providing said vertical aperture equalizing video output signal.

13. A video signal processing circuit as in claim 12; wherein said second subtracting means includes an inverter which inverts said second demodulating output signal and a three terminal variable resistor which mixes the output signal of said inverter with said output signal of said first subtracting means and supplies an output signal therefrom to said adding means.

* * * * *